Jan. 25, 1938.  L. L. WHITSON  2,106,230
TRAILER LEG
Filed Oct. 17, 1936
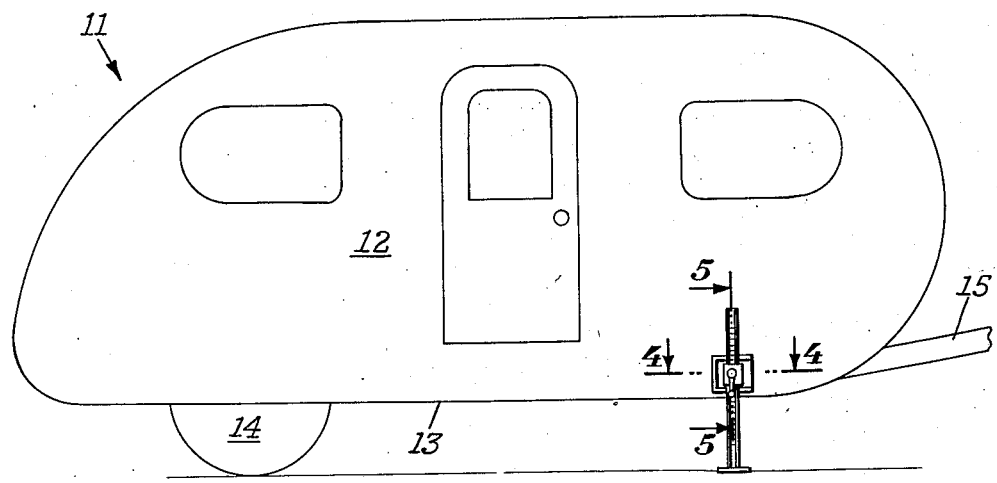
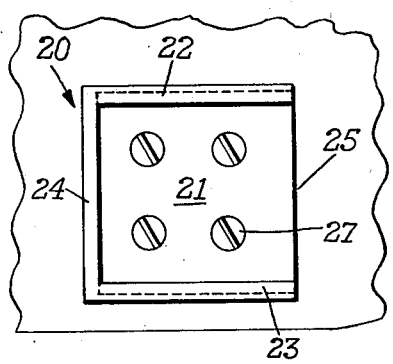
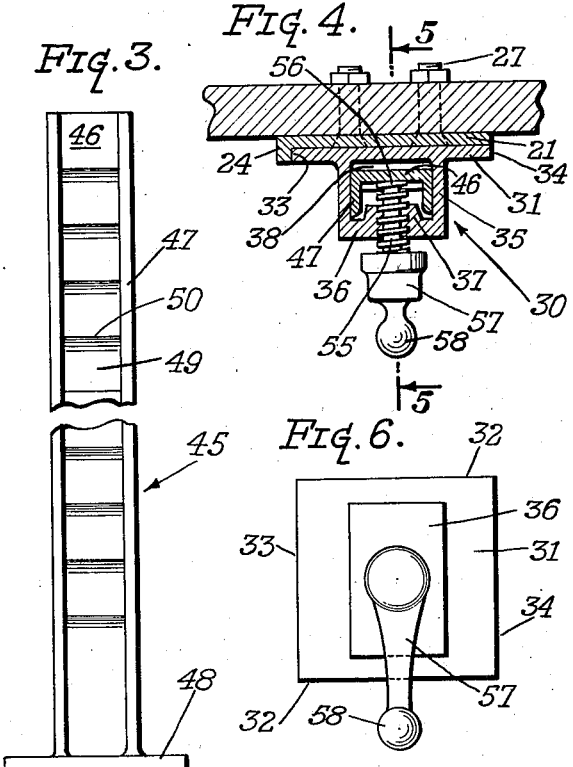
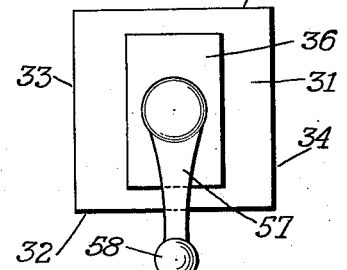
Inventor.
Lincoln L. Whitson
By Hazard and Miller
Attorneys.

Patented Jan. 25, 1938

2,106,230

UNITED STATES PATENT OFFICE 2,106,230

TRAILER LEG

Lincoln L. Whitson, Van Nuys, Calif.

Application October 17, 1936, Serial No. 106,069

7 Claims. (Cl. 248—354)

My invention relates to a trailer leg for detachable connection to a semi-trailer of the type used for living quarters for automobile tourists.

An object and feature of this invention is a readily attachable and detachable leg which may be connected to the forward portion of the trailer preferably before this is disconnected from the towing vehicle and the leg being adjusted to engage the ground retaining the floor of the semi-trailer in substantially a horizontal position. A further detail feature is to have the leg assembly attached to the vehicle preferably on the outside wall so that the party operating the semi-trailer can make the leg attachment and adjustment without having to get underneath the body of the trailer.

Another object and feature of my invention is having a wall plate permanently attached to the outside and preferably vertical wall of the body of the trailer or to a vertical surface suitable for this purpose, this wall plate having guides to which the other portions of the leg assembly may be connected. A further feature is employing a readily removable vertical guide structure which may be fitted to the wall plate and held in the guides of this plate with a vertical guide opening in proper position to receive the removable leg.

Another characteristic feature of the leg is that this may be fitted in the channel guide and by means of a screw held in an upper position until the trailer body is properly adjusted, then by unthreading the screw this drops downwardly to engage the ground, having a foot for this purpose and then may be clamped by means of the screw, such screw operating through the guide structure and engaging the leg. A detail feature of the leg is forming this somewhat in the manner of a rack with a series of widely spaced teeth, each tooth having a horizontal ledge and immediately below an outward slope merging with the root of the tooth next below. Thus when the screw is threaded tight against the root of one of the teeth it engages the ledge and thus clamps the leg in the proper adjusted position.

My invention is illustrated in connection with the accompanying drawing, in which:

Fig. 1 is a side elevation of a semi-trailer with my invention shown in elevation attached thereto.

Fig. 2 is an elevation of the wall plate.

Fig. 3 is an elevation of the leg and foot.

Fig. 4 is a horizontal section substantially on the line 4—4 of Fig. 1 in the direction of the arrows showing the assembly of the wall plate, leg and clamping screw and vertical guide structure.

Fig. 5 is a vertical section on the line 5—5 of Figs. 1 or 4 taken in the direction of the arrows.

Fig. 6 is an elevation of the guide assembly and screw taken in the direction of the arrow 6 of Fig. 5 omitting the leg and the wall plate.

In the illustration the semi-trailer 11 is illustrated as having a side wall 12, a bottom 13 to be maintained in substantially a horizontal position, wheels 14 and a towing tongue 15.

In my invention I utilize a wall plate 20 (note particularly Figs. 2, 4 and 5). Such plate has a flat panel 21 with upper and lower guide rims 22 and 23 and an end abutment rim 24. Thus the front edge 25 of the panel may be considered as open, that is, not having any guide channel rim or abutment rim. The guide channel has undercut grooves indicated at 26. This wall plate is held in place by bolts 27 having countersunk heads and secured to the framing of the wall 12 of the semi-trailer. This is thus left permanently in position, the rest of the device being assembled and disassembled when desired.

The vertical guide assembly structure 30 has a substantially square base plate 31 with upper and lower edges 32 fitting in the channels 26 of the upper and lower rims 22 and 23. It has a vertical edge 33 on one side engaging the abutment rim 24. The opposite vertical edge 34 is adapted to align with the edge of the panel 21 at the open portion 25.

On the base there are two vertical guide walls 35, these being of less heighth than the base 31 and there is a face plate 36 connecting these. Such plate has a central vertical thickened section 37 extending inwardly. This structure therefore forms a vertical guide opening 38 (note Figs. 4 and 5). The upper inner edge 39 of the face plate 36 may be slightly beveled as shown in Fig. 5.

A leg 45 is illustrated as having a central web portion 46 with two vertical ribs 47 on each side, the leg terminates in the flat foot 48. This leg is provided with a series of teeth somewhat of a rack-teeth type, the individual teeth having a root or base 49, a horizontal ledge 50 extending outwardly from the root which is preferably vertical. There is a beveled section 51 leading from the root of one tooth to the ledge of the next. This forms a type of rack and the leg which is thus somewhat channel-shaped fits in the vertical opening 38. The vertical ribs 47 engage the side walls 35 of the guide structure 30 and the back of the web portion 46 engages the outside of the upper and lower channel rims 22 and 23.

The leg is held and adjusted in place by a screw 55 threaded through the central portion of the base plate 36 and through the thickened section 37 thereof. This screw has an operating inner end 56 to be brought into engagement with the root of the teeth to have the portion adjacent the inner end next on the ledge of a tooth. A crank 57 is attached to the screw and has an operating crank handle 58.

In using my invention the procedure is somewhat as follows: When it is desired to separate the semi-trailer from the towing vehicle, the operator may first fit the vertical guide assembly 30 in the wall plate 20. As above mentioned, the upper and lower edge portions 32 of the base plate 31 fit in the grooves and channels 26, thus allowing the vertical guide structure to be guided in place, this being inserted through the rimless end 25 of the wall plate. The inner end of the base 31 engages the abutment rim 24 as shown in Fig. 4. This properly centers the guide structure in relation to the wall plate and it is held in place by the undercut grooves 26. If desired before this guide structure is assembled, the leg may be placed in the guide opening 38, the screw 55 being threaded outwardly so that the foot 48 is raised above the ground level and then clamped by the screw. It is only necessary then to unthread the screw 55 sufficiently to allow the leg to drop by gravity and bring the foot into engagement with the ground. The screw may then be thrust inwardly to engage the vertical root 48 between two teeth and when so clamped the leg will be of the proper length to retain the floor or bottom 13 of the semi-trailer substantially horizontal. Should the trailer have been disconnected from the towing vehicle it may be tilted upwardly at the front so that the upper end of the leg may be slipped upwardly through the guide opening 38 and then the foot on the leg brought into the engagement with the ground and clamped by the screw 55, this being manifestly operated by the crank 57.

A characteristic of my invention resides that in jamming the screw 55 into tight clamping relation with the web 46 of the leg 45, that this performs a dual function. In view of the fact that the guide assembly 30 has its base plate mounted in the channels of the guide rims 22 and 23 of the wall plate and that the back of the web of the leg is forced against these rims, the guide assembly 30 is thus firmly attached to the wall structure 20 and the leg is adjusted with its foot at the desired distance below the wall plate. Therefore my construction of the leg assembly is readily detachable for when the screw 55 is unthreaded it releases the pressure of the web of the leg against the rim 22 and 23 so that the foot of the leg may be readily lifted above the ground level and the guide assembly 30 readily removed from the wall plate 20. The screw may then be tightened so that the leg is held firmly in the guide assembly and thus prevents possible loss of the guide assembly 30 and the leg structure 45 and these may be stored as a unit either in the trailer or in the towing vehicle.

Various changes may be made in the details of the construction without departing from the spirit or scope of the invention as defined by the appended claims.

I claim:

1. In a device as described, the combination of a wall plate having upper and lower grooved guide rims, an abutment on one vertical edge and being open on the other vertical edge, means to secure the wall plate to a vertical surface of a trailer, a vertical guide assembly having a base plate with upper and lower edges engaged in the grooves of the guide rims and insertable from the open side of the wall plate, the guide assembly having a vertical opening, a leg having a foot extending vertically through said opening, a clamping screw mounted on the guide assembly and having an inner end extending into the vertical opening and adapted to engage the leg when the foot contacts the ground to clamp the leg to the guide rims of the wall plate to the side of the trailer.

2. In a device as described and claimed in claim 1, the guide assembly having two vertical guide walls connected by a face plate, the screw extending through the face plate, the leg having a web with a series of teeth, the teeth having each a horizontal ledge and a bevel below the ledge extending to the root between adjacent teeth, the screw engaging between the teeth, the back of the leg engaging the upper and lower guide rims.

3. In a device as described, the combination of a wall plate having upper and lower guide rims, each with a groove, the grooves being open at one end, an abutment device at the opposite end of each groove, a guide assembly having a base plate removably fitted in the said grooves to engage the said abutment, the guide assembly having vertical guide walls and a face plate defining with the base plate a vertical opening, a leg having a central web with two vertical marginal ribs, the said ribs having a sliding engagement with the guide walls of the guide assembly, the back of the web engaging the upper and lower rims of the wall plate and a clamping means mounted on the face plate of the guide assembly to engage the web of the leg when the foot of the leg engages the ground, and clamp the back of the web against the upper and lower rims of the wall plate.

4. In a device as described and claimed in claim 3, the clamping means including a screw threaded through the face plate, the web of the leg having a series of teeth, each tooth having a horizontal ledge, a vertical root portion and a beveled surface from the root portion to the outside portion of a ledge next-above whereby the inner end of the screw may engage the root between two teeth and contact with the ledge of the tooth below the screw.

5. In a device as described, the combination of a wall plate having means for attachment to the side of a trailer, the wall plate having upper and lower guide rims, each with a groove, the grooves being open at at least one end, a guide assembly having a base plate removably fitted in said grooves, the guide assembly having a vertical opening defined at the front by a face plate, a leg having a web slidably mounted in the said vertical opening and having a straight back to engage the said rims and with a series of horizontal teeth, the upper surface of each tooth forming a ledge, a screw threaded through the face plate of the guide assembly to engage between adjacent teeth of the leg and clamp the back of the web against the upper and lower guide rims of the wall plate.

6. In a device as described, the combination of a guide assembly having a vertical opening defined at the front by a face plate with a screw threaded therethrough, a supporting structure for the guide assembly having means for attachment to the side of a trailer, a leg fitted in the opening of the guide assembly and having a web with a smooth surfaced back and a series of transverse teeth, the upper edge of each tooth forming a ledge, the screw being adapted to engage the front of the web above a ledge of a tooth and to clamp the back of the leg against the supporting structure attachable to the side of the trailer.

7. In a device as described, the combination of a guide assembly having a base plate, two vertical guide walls spaced apart and connected by a face plate, a screw threaded through the face plate, a leg positioned between the vertical guide walls, the face plate and the base, said leg having a web and two marginal ribs, the said rib engaging the guide walls, the back of the web being smooth surfaced and the front of the web having a series of transverse teeth, each tooth being defined by a ledge facing upwardly, a supporting structure for the base plate having means for attachment to the side of a trailer, the screw being adapted to clamp the back of the web against the said supporting structure and the screw to engage above a ledge between two adjacent teeth.

LINCOLN L. WHITSON.